UNITED STATES PATENT OFFICE.

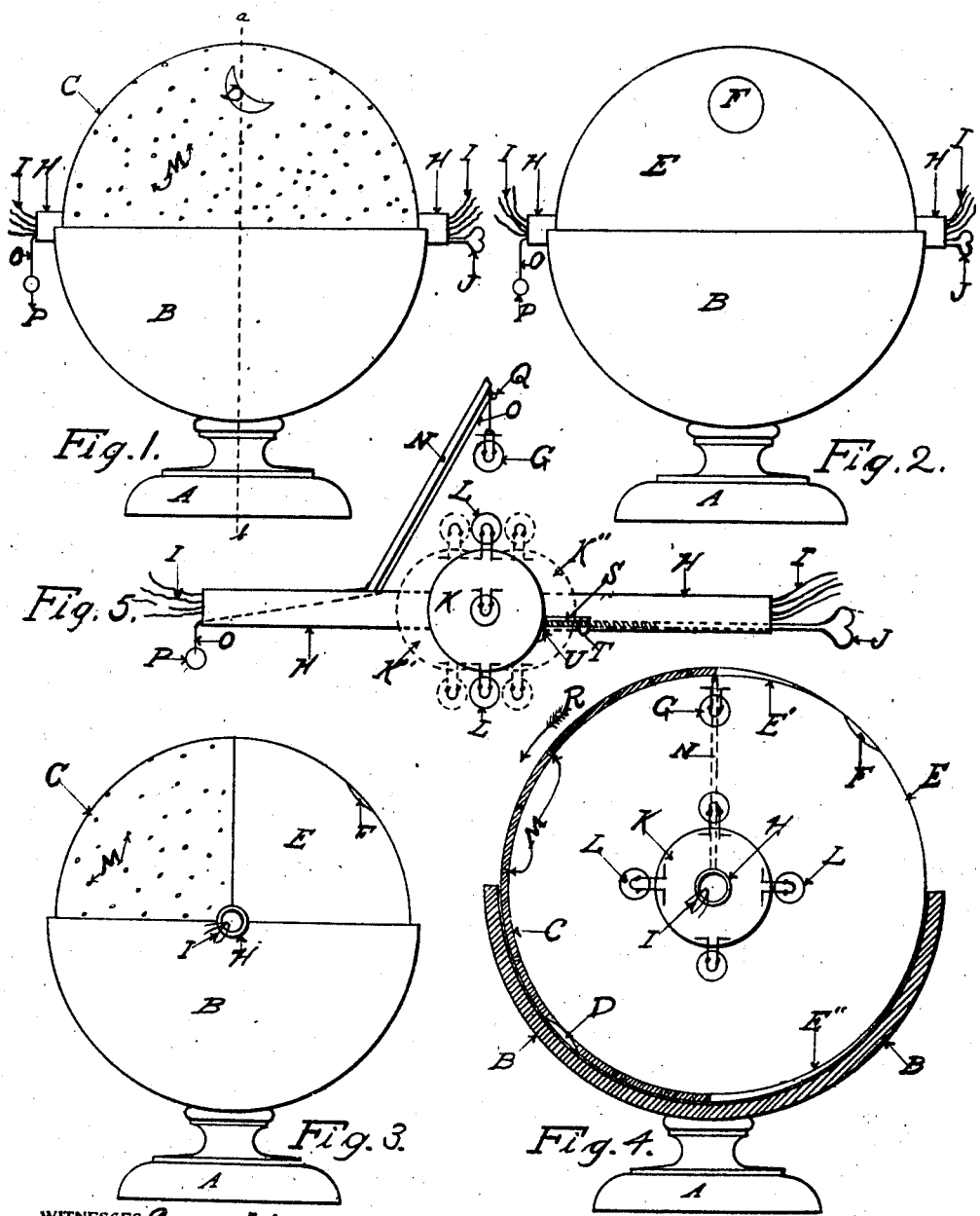

OLIVER PINKNEY JONES, OF BEAUMONT, TEXAS.

PICTORIAL FIRMAMENTAL MACHINE.

988,471.  Specification of Letters Patent.  Patented Apr. 4, 1911.

Application filed February 28, 1910. Serial No. 546,522.

*To all whom it may concern:*

Be it known that I, OLIVER P. JONES, a citizen of the United States, residing in Beaumont, in the county of Jefferson and State of Texas, have invented a new and useful Machine for Enlightenment and Amusement, which I designate a "Pictorial Firmamental Machine," of which the following is a specification.
My invention consists of a machine for enlightenment and amusement, having a hollow globe revoluble on a hollow axis; said hollow globe being composed of two halves; one half of which is perforated to represent a map of the heavens, the other half being transparent. Inside the hollow globe is the arrangement for illumination. Around the lower half of the hollow globe is a blind to which is fastened the axis, all so arranged that when an apartment having a curved ceiling representing the sky down to the horizon as seen from any part of the earth, has been darkened and the proper illumination being provided inside of the hollow globe, it will allow the light to pass through the perforations, which being reflected on the curved ceiling representing the sky, will show the position of the stars and moon as seen from the earth from any desired place.
Revolving the globe in the desired direction will show the moon and stars passing over head from horizon to horizon, and continuing to revolve the globe will show the gradual appearance of daylight until the rising of the sun. Continuing to revolve the globe, daylight is exhibited gradually decreasing to a golden sunset, twilight and finally darkness with the appearance of the stars and moon. By an arrangement within the hollow globe, the means of illumination can be slowly moved to right or left, and that part of the globe showing the sun, being turned to the desired position, and the means of illumination having been moved to the desired position, will cause the sun to appear on the ceiling representing the sky, as seen from any part of the earth, at any time of the year, or any time of the day desired. A light in the globe so arranged as to allow of its being raised or lowered, will when raised to near the casing of the globe, cause the stars to expand, and the light being lowered some distance from the casing causes the stars to contract. My invention is therefore adapted to the ocular demonstration of elementary astronomical subjects. I attain these objects by the mechanism illustrated in the accompanying drawings, which form part of this specification.

Figure 1 is a front view of the machine, showing that part of the globe which is perforated. Fig. 2 is a front view of the machine, showing that part of the globe which is transparent. Fig. 3 is a side view of the machine, showing the globe turned partly around, and showing part of the perforated part, and part of the transparent part. Fig. 4 is a sectional view of the machine slightly enlarged, taken on the dotted line $a$, $b$, Fig. 1, but having the globe turned as in Fig. 3. Fig. 5 is a view of the machine, showing the arrangement of the lights and the manner in which they are manipulated.

Similar characters of reference, refer to similar parts of the different views.

A hollow hemisphere B representing a blind, is securely fastened to a stand or pedestal A. To the blind B, is securely fastened a hollow axis H H, around which and inside the blind B revolves a hollow globe, one-half C, of which is perforated to represent stars M and moon D, and fastened to the other half E, in which is located the sun F. Said half E being so arranged as to be opaque where hemisphere E joins hemisphere C, and then gradually becomes more transparent until it is wholly transparent at the sun F; the gradual increase in transparency being brought about by means of several layers of cloth as shown at E′ E″, Fig. 4, or by means of stained glass.

Inside of the hollow globe composed of the perforated half C, and the transparent half E, and so arranged as to slide easily along the axis H H, is a device K to which is fastened the means L of illuminating the interior of the hollow globe, preferably electric lights, which receive the necessary current through the wires I. A slot S is cut into the hollow axis H H, and inside the hollow axis H H, is fastened a plate T, having a threaded hole, through which passes a thumb-screw J fastened at U to the device K, so as to allow of easy manipulation. By turning the thumb-screw J, the device K with the means of illumination L attached will slide along the axis H H to position shown at K′ by the dotted lines. Reversing the turning of the thumb-screw J, will bring the device K to the position shown at K″ by the dotted lines. To the hollow axis H H, is securely fastened a rod N, at the upper end of which is fastened a small pulley or screw-eye Q through which passes a wire O to one end of which is fastened a light G. The wire O passing through the hollow axis H H, has fastened to it a handle or knob P. Pulling at the handle P causes the light G to rise, and leaving go of the handle P causes the light G to lower. The hollow globe revolving on the axis H H, and inside the blind B, revolves in the direction shown by the arrow R, Fig. 4.

The machine is used in the following manner: A place is secured having a curved ceiling representing the sky. The machine is placed beneath the highest point of the ceiling, the place is darkened and the interior of the machine illuminated with lights desired. By slowly revolving the hollow globe, the light passing through the perforated half will show the stars and moon passing from horizon to horizon, the blind keeping out the light from below. Revolving farther, dawn and sunrise appear, then daylight gradually decreasing to a golden sun-set, and into darkness, with the appearance of the stars and moon. By using different sets of the half of the globe which is perforated, the heavens can be shown just as they appear from any point of the earth desired. By using clock-work the movement of the stars can be followed accurately. By means of the thumb-screw the light is manipulated from side to side, thereby throwing the light of the sun to any part of the sky desired, and thereby showing the exact position of the sun as seen from any part of the earth.

Having now described my invention, I claim as new and desire to secure by Letters Patent:

In a machine for enlightenment and amusement, a hollow hemisphere supported with its convex surface downward; a hollow shaft or axis secured diametrically across the hollow hemisphere; a hollow globe revoluble upon the hollow shaft or axis and within the hollow hemisphere, one half of said globe being opaque and perforated to represent a map of the heavens, the other half being opaque where it joins the perforated half and increasing in transparency as it recedes therefrom and approaches a certain point in its surface; an illuminating apparatus within the hollow globe and movable along the hollow shaft or axis; and a device, secured to the hollow shaft or axis and within the hollow globe, for raising and lowering a light.

In testimony whereof I have signed my name to this specification in the presence of two subscribing witnesses.

OLIVER PINKNEY JONES.

Witnesses:
C. W. SMITH,
SAMUEL SCOTT.